UNITED STATES PATENT OFFICE.

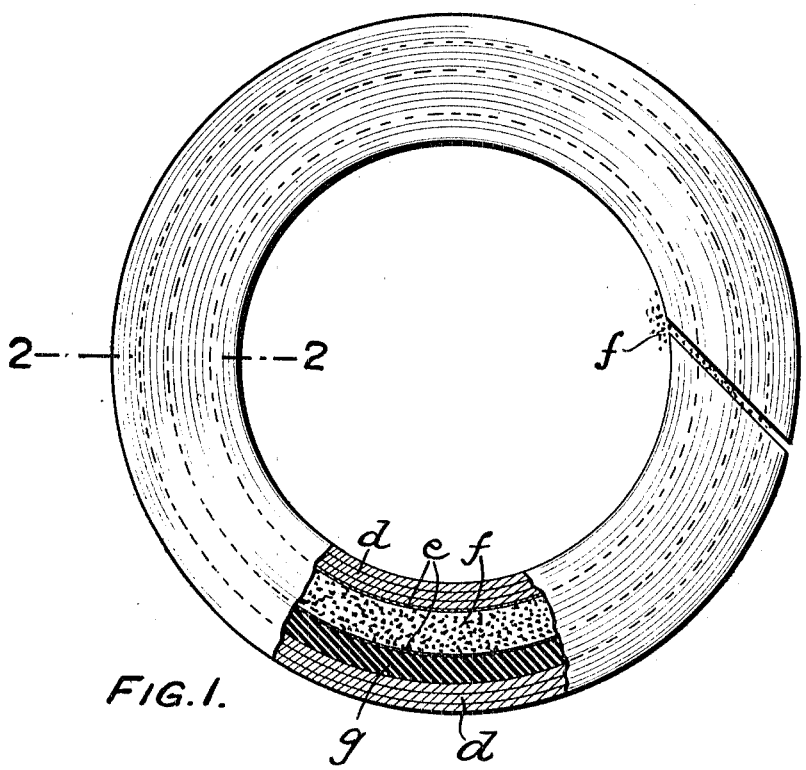
F. H. BROWN.
PACKING.
APPLICATION FILED JAN. 27, 1914.
1,119,803.
Patented Dec. 8, 1914.
FIG. 1.
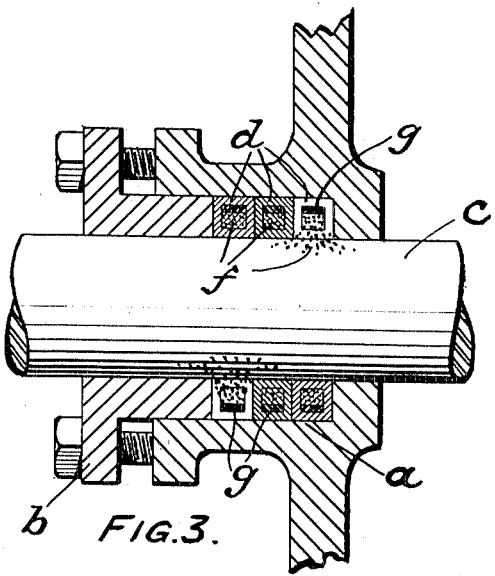
FIG. 2.
FIG. 3.
WITNESSES:
Rob. R. Kitchel.
E. E. Wall
INVENTOR
Franklin H. Brown
BY
Frank L. Busser
ATTORNEY.

FRANKLIN H. BROWN, OF PHILADELPHIA, PENNSYLVANIA, ASSIGNOR TO P. WILSON ADLER, OF PHILADELPHIA, PENNSYLVANIA.

PACKING.

1,119,803.  Specification of Letters Patent.  Patented Dec. 8, 1914.

Application filed January 27, 1914. Serial No. 814,626.

*To all whom it may concern:*

Be it known that I, FRANKLIN H. BROWN, a citizen of the United States, residing at Philadelphia, county of Philadelphia, and State of Pennsylvania, have invented a new and useful Improvement in Packing, of which the following is a full, clear, and exact description, reference being had to the accompanying drawings, which form a part of this specification.

My invention relates to packing for piston rods, valve rods and other parts of engines and machines working through stuffing boxes.

The object of the invention is to provide a packing which will present a smooth antifriction surface to the moving parts with which it contacts under the most severe conditions of prolonged service and will be durable and lasting, and which is also capable of being embodied in a form that will withstand the highest pressure.

A preferred embodiment of my invention is shown in the accompanying drawings, in which:

Figure 1 is an enlarged plan view, partly broken away of a single packing ring. Fig. 2 is a cross-sectional view of the packing on the line 2—2 of Fig. 1. Fig. 3 is a longitudinal section of a stuffing box showing the packing in position.

*a* represents the stuffing box, *b* the packing gland and *c* a piston rod. The packing, which is made in spiral coils, is preferably cut into separate broken rings, each of which has approximating beveled opposite ends, as shown in Fig. 1; and a series of these rings are arranged in the stuffing box in the usual way, as shown in Fig. 3.

The packing comprises a body *d* composed of a woven asbestos cloth inclosing a tube *e* of cotton or other readily combustible material, which in turn incloses a dry, flaky, homogeneous lubricator *f*, and also (preferably, but not necessarily) a ring *g* of rubber or other elastic material arranged nearest the outer or convex wall of the packing ring. As I more particularly contemplate the use of the packing under high pressure conditions, I prefer to employ asbestos cloth as the medium forming the body of the packing. The asbestos cloth entirely incloses and protects the tube *e* and its contained lubricator *f* except at the ends of the broken ring, where the lubricator is not protected or inclosed by the asbestos cloth. I prefer that the tube *e* shall also be an open-ended tube. The substance that I employ as a lubricator is either graphite or mica, or a mixture of these materials, which is unmixed, substantially and preferably entirely, with any foreign substances, either solids such as particles of lead or other metal, or liquid or semi-liquid lubricants such as oil or tallow; the importance of practically excluding such substances being hereinafter set forth. Such materials as soapstone and talc could not be used in substitution for graphite and mica, because their adhesive qualities are weak and they would soon wash out of the packing.

As is well understood, packing rings of the general class to which my invention belongs are initially coated with graphite before being placed in the stuffing box, but this initial coating very speedily wears away, and it therefore performs no measurably useful service. In a packing constructed in accordance with my invention, the application of the usual compressing force to the packing squeezes the contained graphite or mica, and, forcing it to take the line of least resistance, causes it to exude from the open ends of the ring, whence it is distributed throughout the interior of the stuffing box and particularly along the surfaces of the packing that are subjected to friction. On the other hand, when the cotton tube inclosing the graphite or mica is burnt away in use, as happens in the presence of a great degree of heat, the graphite will work out due to the increase in the internal volume of the tube. In other words, decreasing or increasing the internal volume of the tube produces the same effect, the graphite or mica escaping in one case by reason of increased pressure and in the other case by reason of decrease of resistance to outward flow arising from increase in the volume of the space containing the graphite or mica. The leakage of the graphite or mica is gradual, and diminution in the mass of the packing due to escape of the graphite or mica can be taken up by the packing gland in the usual way.

It has been found that a packing constructed in accordance with my invention will retain all its original qualities for a prolonged period. On the one hand, it suffers no deterioration until it has been used for a time greatly exceeding the life of the ordinary packing; and on the other hand it exhibits no change in essential characteristics after prolonged use, but continues to perform all the functions performed in the early stages of its use until the practical efficiency limit of the asbestos cloth, which limit is, of course, much extended by the effective lubrication afforded by the graphite or mica.

I am aware that it has been proposed to inclose, in a packing body, graphite intermixed or closely associated with metallic particles, or even sheet metal; but such non-homogeneous substance in time becomes converted into a form of rigid metal packing and loses entirely, or in large measure, its original properties.

I am also aware that it has been proposed to add to compositions similar to the above, oil, grease, tallow and the like; but such substances perform their intended function only temporarily, and by soon burning out hasten the disintegration of the packing.

I am also aware that it has been proposed to inclose a mixture of graphite and lead in a porous tube with a view of causing the contents to be forced out through the walls of the holder; but the leakage of the lubricant is at first excessive and then deficient, after which the lubricant is converted into practically a solid ring as aforesaid.

I am also aware that it is known to use an outer envelop of cotton yarn inclosing an inner tube of cotton wick which in turn incloses soapstone, talc or some like substance; but in such a packing not only does the lubricating material possess weak adhesive properties, causing it to soon wash out of the packing, but the inclosing double tube is destructible as an entirety. Consequently this packing would have a very short life.

I am also aware that it has been proposed to inclose graphite in a tube of lead or other soft metal, but such metals have been found unsatisfactory or even unavailable for most steam packings, inasmuch as it melts and runs away when subjected to a high temperature. On the other hand, as long as it lasts, it provides no means for increasing the capacity of the tube so as to facilitate the flow of graphite to the outside of the tube.

It has also been proposed to inclose metal shavings in a muslin tube in turn inclosed in an outer envelop of anti-friction metal and brass; but the metal shavings perform no lubricating function, while the outer tube is destructible, as before stated, when subjected to an elevated temperature.

Other expedients having in view automatic and effective lubrication have been proposed, but they have not met the desideratum sought by applicant of attaining that end without sacrifice of durability and without alteration of the original properties.

Having now fully described my invention, what I claim and desire to protect by Letters Patent is:

1. A packing comprising a core of graphite, an inclosing open-ended tube of relatively thin and destructible material and an outer open-ended envelop of fibrous incombustible wear-resisting material.

2. A packing comprising a core of graphite, an inclosing tube of relatively thin and destructible material and an outer envelop of fibrous incombustible material, said packing including means permitting the graphite to escape from its inclosing tube and envelop to the exterior of the packing.

In testimony of which invention, I have hereunto set my hand, at Philadelphia, on this 7th day of January, 1914.

FRANKLIN H. BROWN.

Witnesses:
M. M. HAMILTON,
E. E. WALL.